A. L. FRAIL.
BREAD RAISER.
APPLICATION FILED MAR. 25, 1915.
1,168,718.
Patented Jan. 18, 1916.
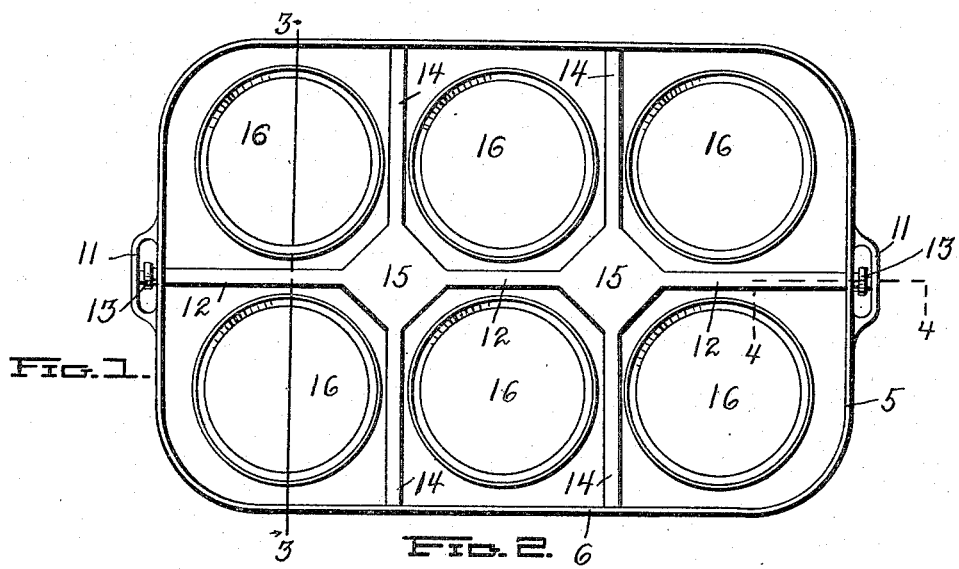
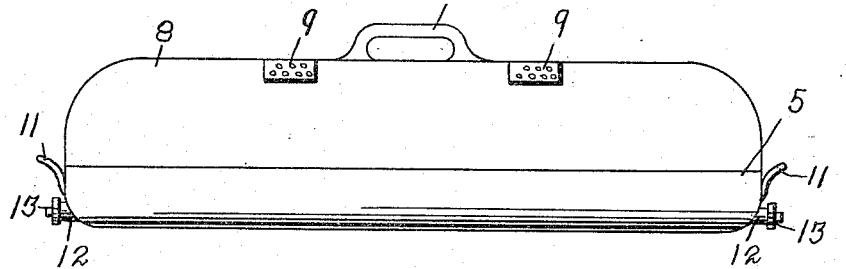
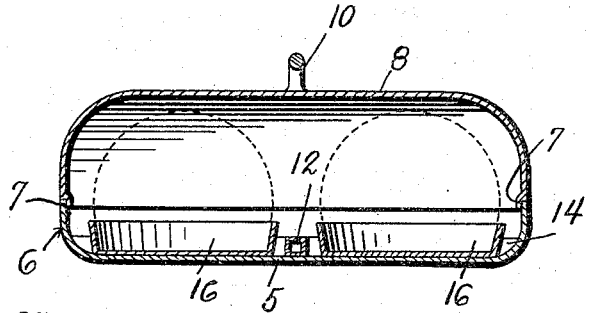
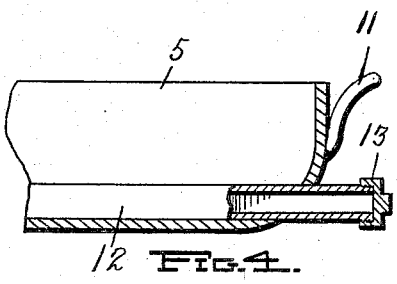
Witnesses
Arthur K. Moore
Inventor
A. L. Frail
By
Attorneys
THE COLUMBIA PLANOGRAPH CO., WASHINGTON, D. C.

UNITED STATES PATENT OFFICE.

ALFRED L. FRAIL, OF WELLSVILLE, OHIO.

BREAD-RAISER.

1,168,718.

Specification of Letters Patent.

Patented Jan. 18, 1916.

Application filed March 25, 1915. Serial No. 16,924.

*To all whom it may concern:*

Be it known that I, ALFRED L. FRAIL, a citizen of the United States, residing at Wellsville, in the county of Columbiana, State of Ohio, have invented certain new and useful Improvements in Bread-Raisers; and I do hereby declare the following to be a full, clear, and exact description of the invention, such as will enable others skilled in the art to which it appertains to make and use the same.

This invention relates to new and useful improvements in dough raisers and is particularly directed to the provision of such a device adapted to receive a plurality of dough carrying pans and to provide means for providing heat so that an equable and proper temperature may be maintained to facilitate the fermentation or "raising" of the dough.

It is the object of the present invention to provide such a device with which the pans of dough may be readily associated and in which they are held against abutting engagement, and are properly heated, it being more specifically in this connection the object to so position the heating means that it holds the pans in spaced relation.

It is a further object of the invention to provide such a device which is of such design that it may be manufactured at a comparatively low cost without sacrificing any of the normal advantages of durability and efficiency in operation.

With the above and other objects and advantages in view, the invention resides more particularly in the novel combination, formation and arrangement of parts more fully hereinafter described and pointed out in the appended claim.

Reference is had to the accompanying drawings, wherein similar characters of reference designate corresponding parts throughout the several views, and in which:

Figure 1 is a top plan view of the improved bread raiser with the cover removed and showing a plurality of bread raising pans disposed therein. Fig. 2 is a side elevation of the improved device, with the cover shown in place. Fig. 3 is a transverse sectional view on the line 3—3 of Fig. 1, and Fig. 4 is a detail sectional view on the line 4—4 of Fig. 1.

Referring now more particularly to the accompanying drawings, the improved bread raiser is shown as comprising a substantially oblong pan 5 having its side flange 6 adapted to seat the depending flange 7 of a cover 8, this cover being spaced a sufficient distance from the bottom of the pan to permit the dough to raise to a desired height. An outlet for the air which expands in the compartment thus formed comprises a plurality of vent holes 9 in the top of the cover. The cover is provided with a suitable handle 10, and the pan carries handles 11.

The heating means for the bread raiser comprises a tube 12 which extends longitudinally of the pan and has its ends passed through the flange 6 thereof, and closed by the cap 13 threaded thereon. A pair of spaced transverse tube members 14 also are provided and these intersect and communicate with the tube member 12, the tubes adjacent their intersections being enlarged or flared to form the water chambers 15. The bread carrying pans 16 are positioned on the bottom of the main pan 5 and it is seen that the tubes hold them spaced from each other, and at the same time provide a heat supplying means which is distributed evenly with relation to the various bread pans.

From the foregoing it is seen that an exceedingly simple yet highly efficient device has been provided. As the flange 7 of the cover is relatively higher than the flange 6 of the body pan, manipulation of the bread pans with respect to the device is facilitated. The tubes and compartments 15 are adapted to be filled with hot water and they may be readily emptied by unscrewing the caps 13 of the longitudinal tube 12.

What is claimed is:

A dough raiser comprising a body receptacle and a plurality of intersecting communicating water carrying members forming spaced compartments for receiving bread pans.

In testimony whereof, I affix my signature, in the presence of two witnesses.

ALFRED L. FRAIL.

Witnesses:
CHAS. BOYD,
S. H. HALE.

Copies of this patent may be obtained for five cents each, by addressing the "Commissioner of Patents, Washington, D. C."